United States Patent [19]

Thudt

[11] Patent Number: 4,948,157

[45] Date of Patent: Aug. 14, 1990

[54] CONNECTION MEANS BETWEEN ADJACENT ARTICULATED SEGMENTS OF AN OMNIBUS

[75] Inventor: Hubert Thudt, Puchheim/Bahnhof, Fed. Rep. of Germany

[73] Assignee: MAN Nutzfahrzeuge GmbH, Munich, Fed. Rep. of Germany

[21] Appl. No.: 121,477

[22] Filed: Nov. 17, 1987

[30] Foreign Application Priority Data

Nov. 28, 1986 [DE] Fed. Rep. of Germany ....... 3640759

[51] Int. Cl.⁵ .............................................. B60D 1/00
[52] U.S. Cl. .................................... 280/494; 280/498
[58] Field of Search ................... 280/403, 423 R, 408, 280/411 R, 411 C, 424, 433, 437, 434, 474, 494, 495, 498, 504; 296/178

[56] References Cited

U.S. PATENT DOCUMENTS

| 4,162,082 | 7/1979 | Curry | 280/408 |
| 4,603,876 | 8/1986 | Gray | 280/411 C |
| 4,697,526 | 10/1987 | Vigliani | 280/403 |

FOREIGN PATENT DOCUMENTS

| 653235 | 11/1937 | Fed. Rep. of Germany . |
| 1948163 | 7/1970 | Fed. Rep. of Germany . |
| 1948136 | 4/1971 | Fed. Rep. of Germany . |
| 712379 | 10/1931 | France . |
| 986852 | 3/1949 | France ............................ 280/494 |
| 569605 | 11/1975 | Switzerland . |

OTHER PUBLICATIONS

"Die Gelenkigen", *Iastauto Omnibus*, Stuttgart No. 9—Sep. 1979.
"Zukunftszuge", *Nutzfahrzeug*, Juni 1986, p. 26.
Aug. 4, '66, West German Pat. No. 1222382.

*Primary Examiner*—Charles A. Marmor
*Assistant Examiner*—Richard Camby
*Attorney, Agent, or Firm*—Ladas & Parry

[57] ABSTRACT

An omnibus in the form of an articulated vehicle with one traction vehicle and one or more trailer towed thereby characterized in that the traction vehicle is coupled with at least one trailer in a modular fashion by a detachable towbar which at its front end has a hitch or coupling pin, which is connected with a self-locking towing coupling provided at the rear of the respective vehicle and further connected via a fifth wheel with the front end of a trailer and which is connected via turnpins in bearing eyes at the end of the main girders of floor framework of the traction vehicle.

14 Claims, 6 Drawing Sheets

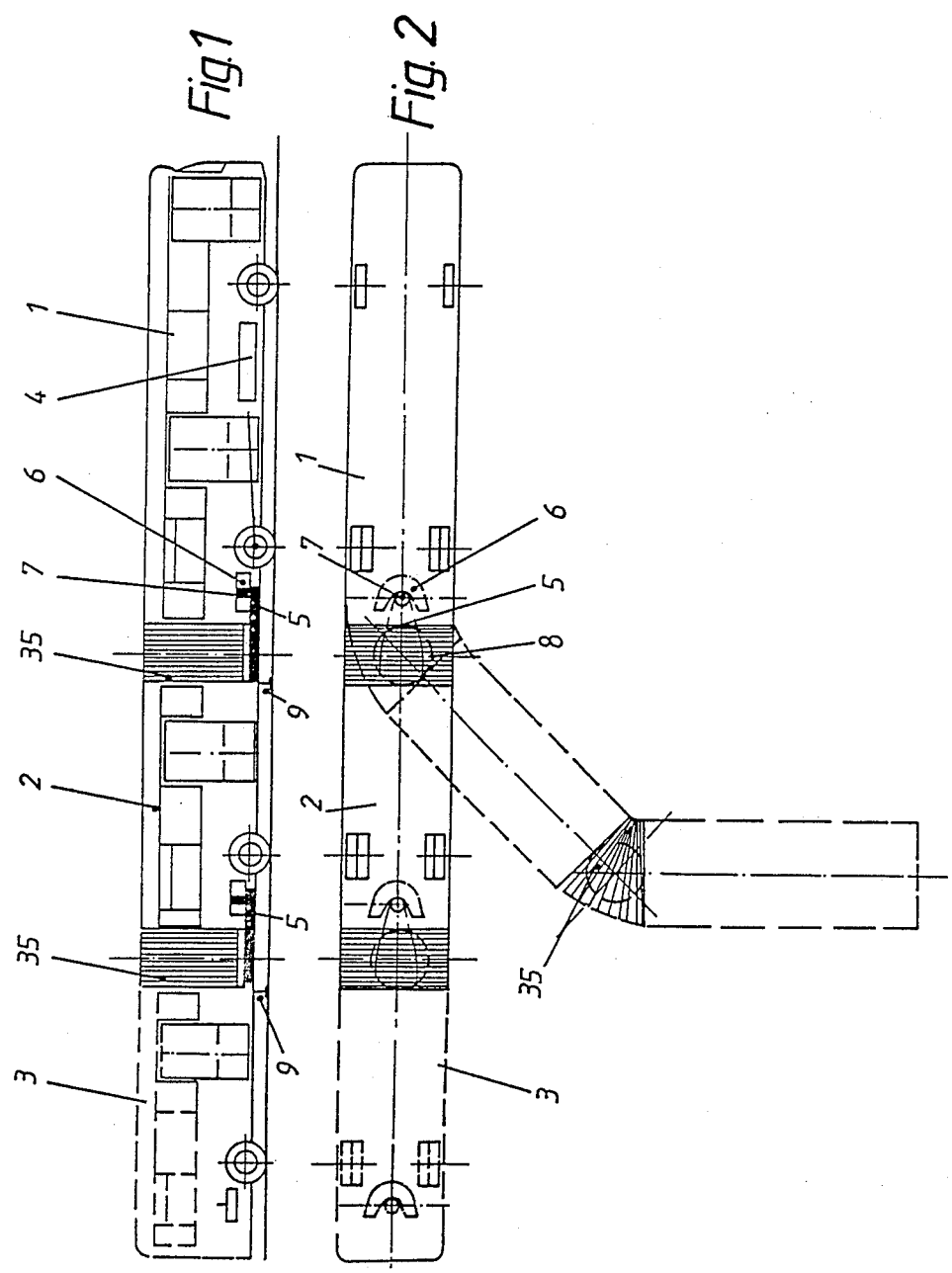

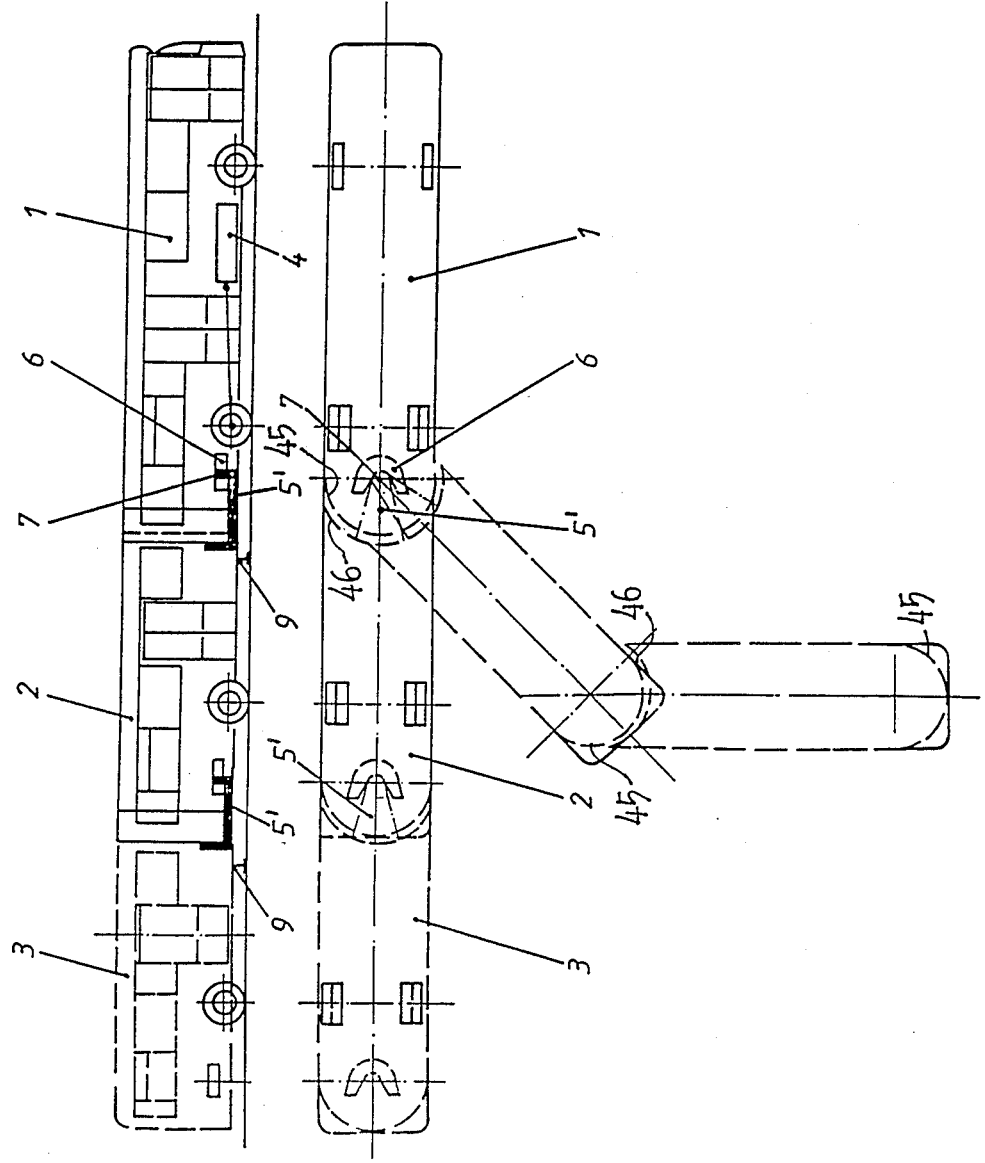

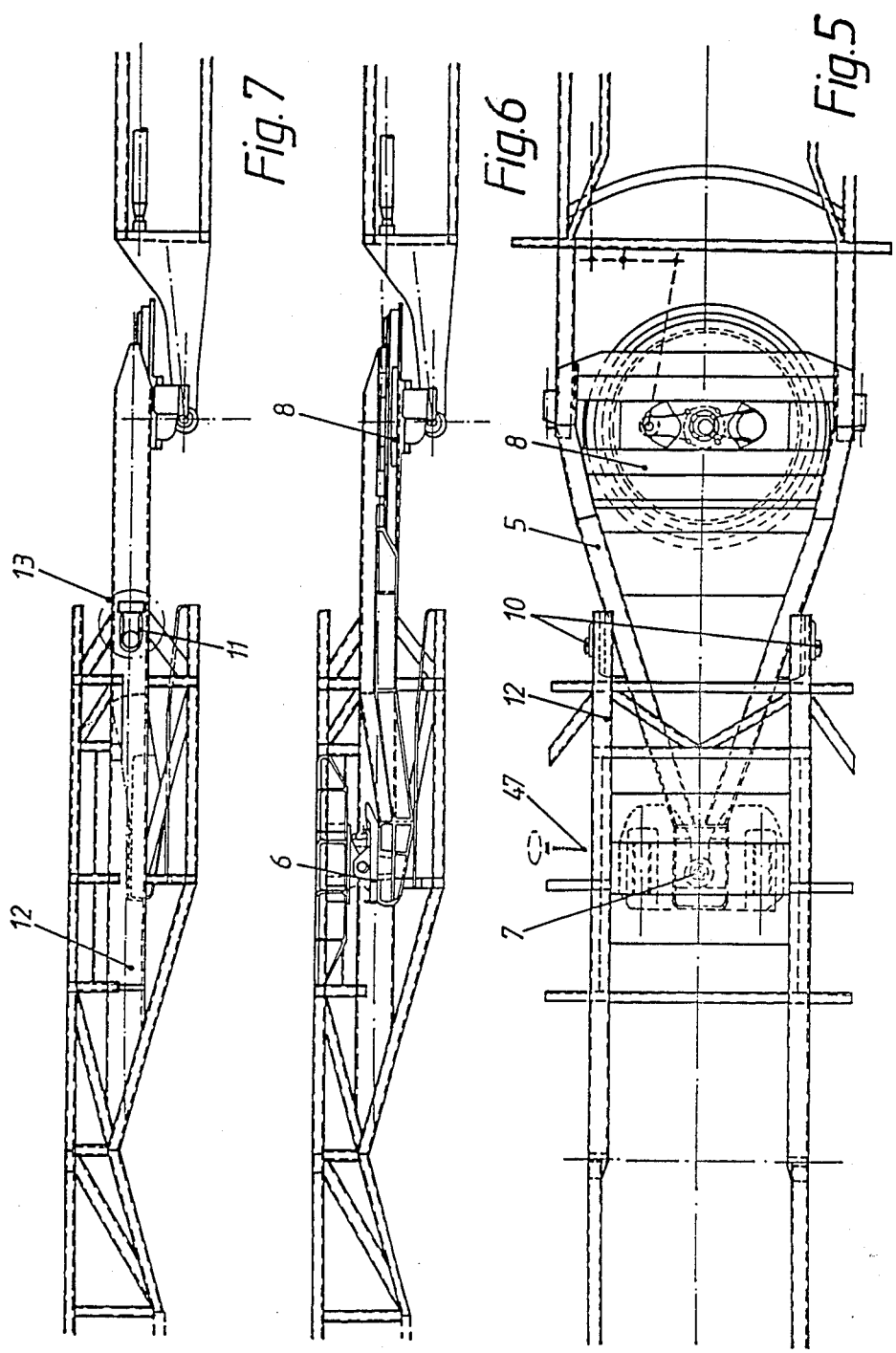

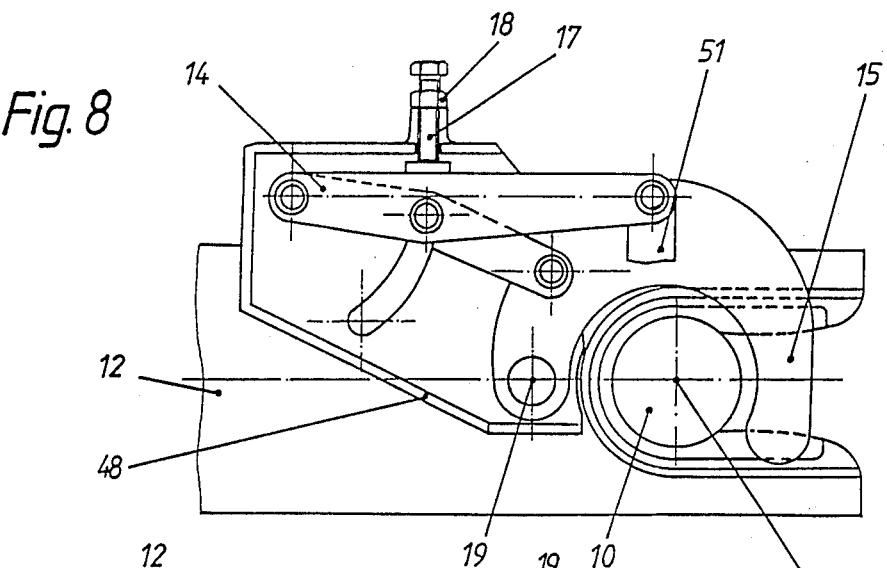
Fig. 8
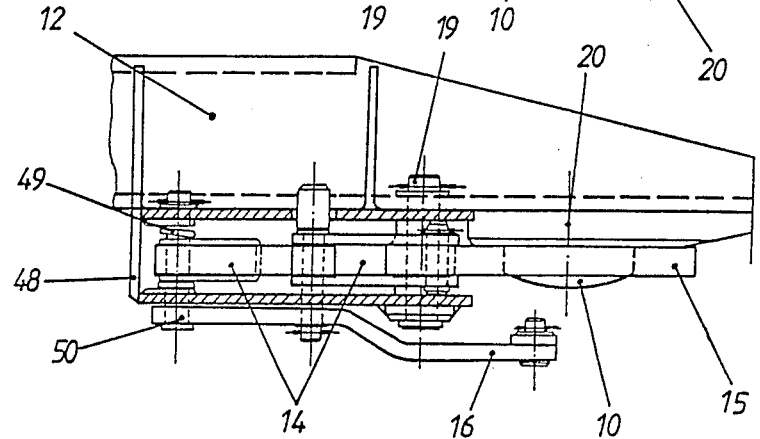
Fig. 9
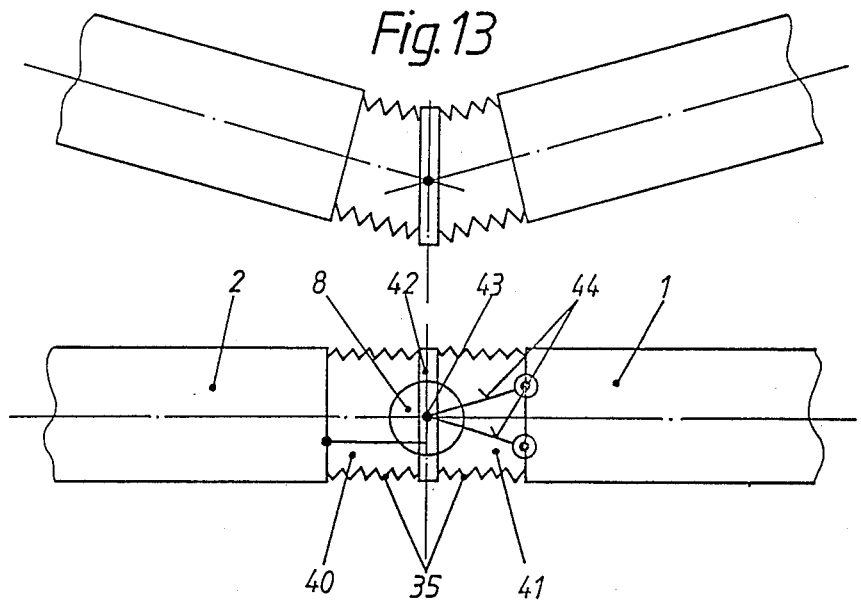
Fig. 13
Fig. 12

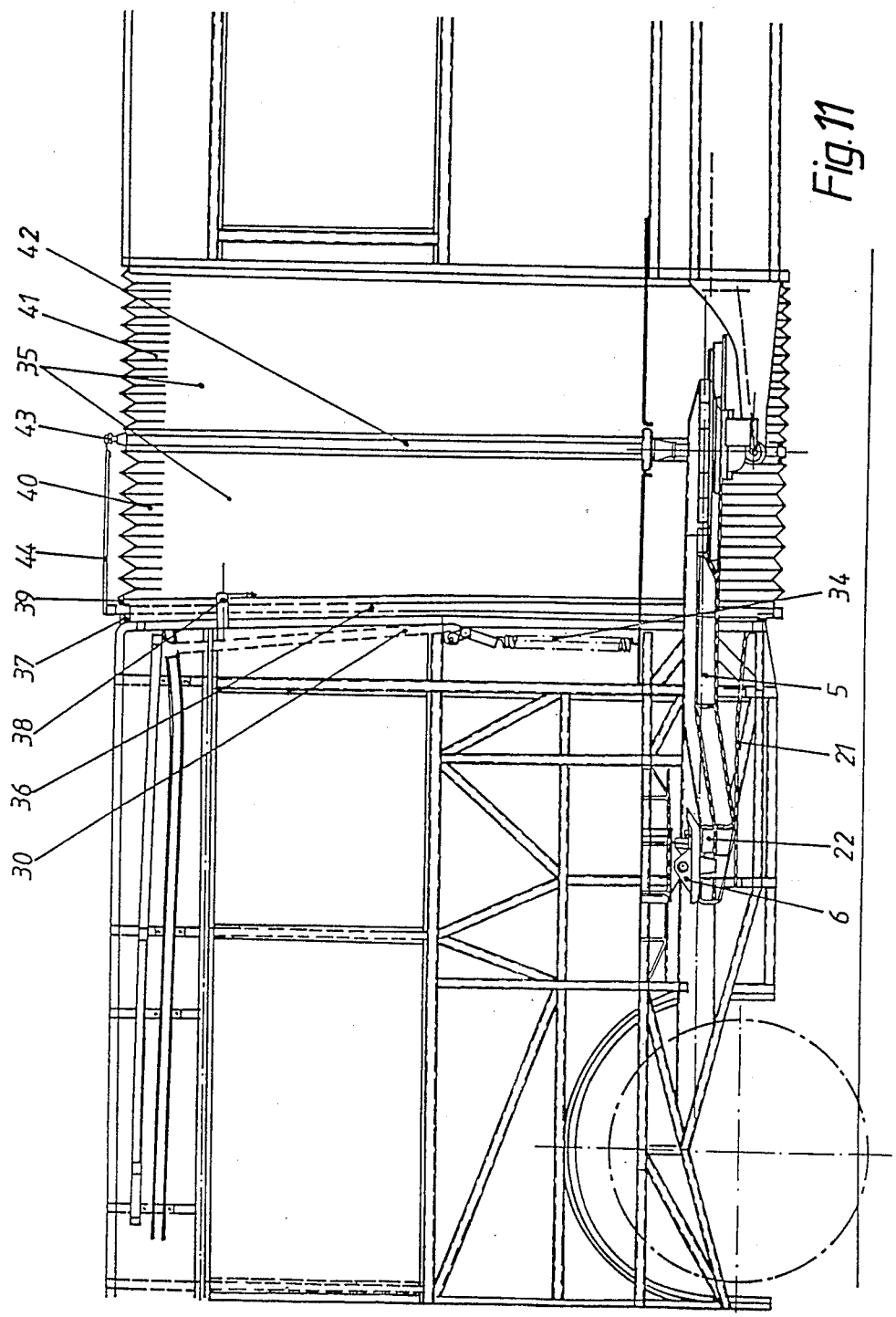

CONNECTION MEANS BETWEEN ADJACENT ARTICULATED SEGMENTS OF AN OMNIBUS

BACKGROUND OF THE INVENTION

The invention relates to an omnibus in the form of an articulated vehicle having one traction vehicle and one or more trailers towed thereby.

Although articulated omnibuses are widely used there are still considerable disadvantages, one such disadvantage being that the length of the vehicle is not able to be varied to suit the passenger loading which varies throughout the day. Furthermore it is necesssary to provide an expensive trailer axle with a fifth wheel, and the road holding properties are not adequate.

SUMMARY OF THE INVENTION

One object of the present invention is to provide a system for rapid coupling and uncoupling of the segments of such an omnibus.

A further object of the invention is to provide such an omnibus wherein coupling is ensured by means of at least one towbar as a standard vehicle component.

Yet a further object of the invention is to provide with an omnibus such an automatic drive-in coupling facility.

A further object of the invention is to provide for adjustment of the towbar lock so that there is no play.

In order to achieve these or other objects indicated herein, in accordance with the present invention an omnibus is provided which is characterized in that the traction vehicle is coupled with at least one trailer in a modular fashion by a detachable towbar which at its front end has a hitch or coupling pin, which is connected with a self-locking towing coupling provided at the rear of the respective vehicle and which is connected via a fifth wheel with the front end of a trailer and which is further connected via turnpins in bearing eyes at the end of the main girders of the floor framework. In such a design it is possible to employ a trailer coupling of conventional design which is incorporated with a suitable strengthening structure in the floor framework of the rear of the vehicle, and the hanging or downwardly extending arrangement of the towing coupling takes into account the main direction of the coupling forces occurring during operation. In the form of a single locking member the coupling is simple and self-centering and fulfills all safety standards during driving about the yard where the omnibuses are parked. The arrangement of the coupling pin held in an upright position in the towing coupling and of the turnpins mounted in the bearing eyes of the main girders means that there is the advantage of a statically determined three point mount with a clearly determined position of action of the forces, the coupling pin taking up the pure tension load of the trailer module and the forces resulting from the nodding or pitching motion of the trailer module acting pro rata overwhelmingly on the saddle plate with a supporting effect in the bearing eyes. Forces resulting from a rocking motion of the trailer module are only taken up by the bearing eyes. To form a train it possible for each trailer module, and not just the traction module, to be provided with a coupling pin at the front end and with a towing coupling at the rear end.

In accordance with one form of the invention the traction vehicle and one or more trailers are connected together modularly using a detachable towbar, which at its front end has a coupling pin, which is rotatable in a self-locking towing coupling arranged at the rear end of the traction vehicle or at the rear end of a trailer. In this respect the towbar is fixedly connected with the front end of a trailer. The front each of the following trailers is made concave and the rear end of the preceding trailer or traction vehicle is made convex. The contours of the rear and front ends of the modules are made convex and concave in accordance with the relative motion of the segments of the chain making up the articulated omnibus. This leads to a functionally satisfactory association of the segments which is of technically sophisticated appearance with a minimum amount of intermediate spaces which have to be sealed off without the use of coupling bellows between segments and without, however, any free passage from one segment to the next.

In accordance with a particularly advantageous feature of the invention the connection between the turnpins arranged externally of the towbar and the bearing eyes located at the end of the main girders has securing means to prevent uncoupling in a horizontal direction unintentionally. The securing means prevents detachment of the trailer or trailers if the coupling pin should fracture. After uncoupling of the towbar the safety hook (forming the securing means) does not have to take up any forces. During coupling and uncoupling a locking means arranged clear of the securing means, of the safety hook may be kept open.

In accordance with a further development of the safety or securing hook the pivot point thereof is in the same plane as the center of the turnpin. Such a design means that when a force acts on the hook there is no moment tending to pivot it into the open position.

The design of the rear end of the traction vehicle and of any trailer is such that the traction vehicle and the trailer has a guide ramp under the towing coupling so that the girder with the coupling pin thereon may slide onto it. This feature means that the coupling pin of the towbar may be moved to its coupling without much effort.

In accordance with a further important feature of the invention at the rear end of the traction vehicle and at the rear ends of the trailers there is a passage that may be shut and opened as may be desired. This makes possible otimum adaptation of the articulated vehicle as regards the best loading to suit the different amounts of traffic at different times of the day.

In a further form of the invention there is a hinged rear door at the rear end of the traction vehicle and possibly of a trailer, such door being able to be moved between a position in which it vertically closes the rear end and a position in which it uncovers an opening in the rear end, the door then being moved horizontally into a storage space between the vehicle roof and the vehicle ceiling. Furthermore, the pivoting rear door may be provided with a crank-operated guide system for moving it in flush alignment with the outer contour of the rear vehicle end and being able to be moved with the use of a circular guide for its lower end and a linear guide at the top end into the horizontal position between the outer vehicle roof and the inner ceiling and such guiding action is affected by rollers pivoted at the upper end of the rear door and running in a guide the rear door is locked in a horizontal terminal position over the rollers so as to bear against a stop. This provides for an attractive appearance of the means covering the rear end when the traction module is used alone, and when the traction module is used with a trailer it enables the rear door to be placed in a space accommodating it without the need for additional assembly and dismounting operations when the vehicles are coupled and uncoupled.

In accordance with a further significant feature of the invention the passages at the rear and front ends of the omnibus segments are connected using bellows, there being a detachable but firmly secured terminal frame on the rear end which is connected on one side with the rear end by means of a seal against which it is pressed by a toggle lever system and on the other side it is connected in a known manner with the bellows by a cord or wire. The bellows is made in two parts which are secured to a bellows frame extending over the center of the fifth wheel so as to turn with the towbar. This design guarantees simple separation of the bellows from the modules, the terminal frames being rigidly connected with the towbar and the bellows frames being rotatably connected therewith so that a single coupling unit results.

To aid the coupling operation the trailer segments are provided with hydraulically or electrically operated supports whose level is able to be adjusted.

LIST OF THE SEVERAL FIGURES OF THE DRAWINGS

FIG. 1 is a side elevation of an articulated omnibus.

FIG. 2 shows the articulated omnibus in plan when driving straight ahead and when turning a corner.

FIG. 3 shows the articulated omnibus from the side.

FIG. 4 shows the articulated omnibus in FIG. 3 in plan when driving straight ahead and when taking a corner.

FIG. 5 shows a detail of the towbar connection between the traction vehicle and the trailer in plan.

FIG. 6 shows a detail of the towbar connection between the traction vehicle and the trailer from the side.

FIG. 7 shows a detail of the towbar connection between the traction module and the trailer in side elevation.

FIG. 8 shows a detail of the securing means as seen in side elevation.

FIG. 9 is a view of a detail of the securing means as seen from above.

FIG. 11 is a side view of the connecting passage between two vehicle modules.

FIG. 12 shows a bellows arrangement as seen from above.

FIG. 13 shows the bellows arrangement in its curved form from above.

DETAILED DESCRIPTION OF WORKING EXAMPLES OF THE INVENTION

Figure 10:
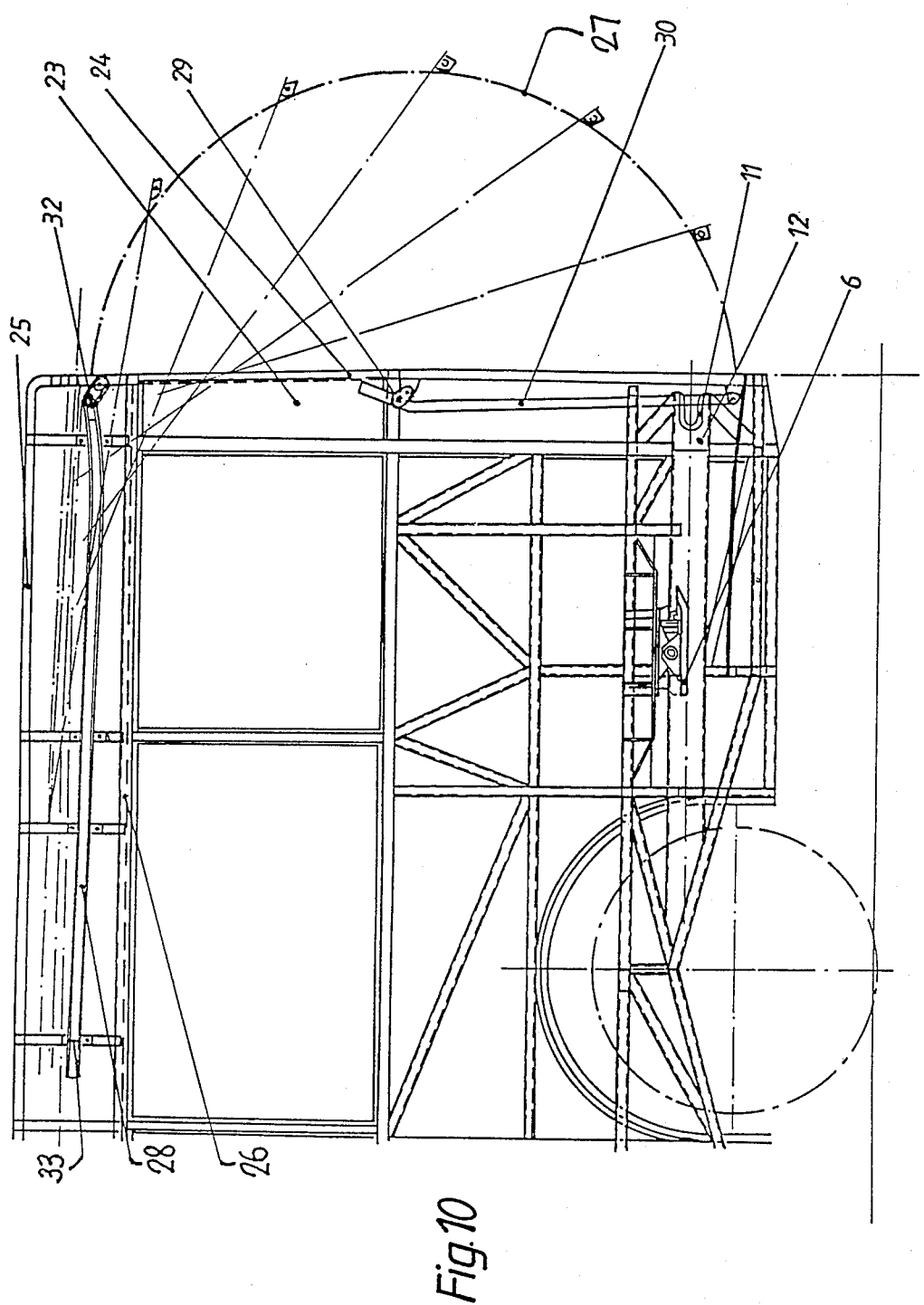
FIG. 10 shows the rear end of the traction or trailer vehicle with a rear door as seen from the side.

FIGS. 1 and 2 show an omnibus with an articulated design so as to comprise a traction vehicle 1 and trailers 2 and 3. The traction vehicle and the trailers are in the form of modules connected together via towbars 5 which may be assembled in any desired configuration as allowed by the modular construction. During the coupling operation a coupling or hitch pin 7 provided towards the front of the towbar 5 snaps into a towing coupling or hitch 6 fixedly secured to the rear of the traction vehicle 1 or of the following trailer 3. In the rear part the towbar 5 is connected by a fifth wheel 8 with the following trailer 2 or 3. Supports 9 are provided as auxiliary elements for the coupling operation. The hitching operation is furthermore facilitated inasfar as there is an upwardly inclined guide ramp 21 (see FIG. 11) in the floor frame in the rear part of the traction vehicle 1 or the trailer 2 so that the carrier 22, receiving the hitch pin, of the towbar may slide up the ramp until the hitch pin 7 snaps home into the towing hitch 6. In the traction vehicle 1 the engine 4 is mounted under the floor. Between the traction vehicle 1 and the trailer 2 and between the trailer 2 and the trailer 3 there are free passages which are covered by bellows 35 connected to the segments of the omnibus so that, as will be seen in FIG. 2 in broken lines, even when the omnibus is turning a corner there is total covering of the opening from one omnibus segment to the next.

FIGS. 3 and 4 show a modification of the articulated omnibus. The connection between the traction vehicle 1 and the trailer 2 or between one trailer 2 and the next one (3) following it is by means of the towbars 5', the rear part of each towbar being fixedly secured to the front end of the trailer 2 and 3, while the rear part is in each case convex at 45 and the front part is concave at 46. The omnibus segments may be pivoted in relation to each other about the hitch pins 7' rotatably mounted in the towing hitch 6. In the case of this modification of the invention there is no passage between one segment and the next for use of the passengers.

The following description is with reference to the first working embodiment of the invention as shown in FIGS. 1 and 2.

FIGS. 5, 6 and 7 show further details of the connection between the rear end of the traction vehicle 1 and the front end of the trailer 2 or between the rear end of the trailer 2 and the front end of the trailer 3 by means of a towbar, 5. On the outer side of the towbar turnpins 10 are securely fixed in place and fit into bearing eyes 11 provided at the end of the main girders 12 of the floor frame so that with the use in addition of the towing hitch 6 engaging the hitch pin 7 it is possible to achieve a secure three-point linkage able to allow for relative and pitching between the motion rotatable. On unhitching the modules the connection between the self-locking towing hitch 6 and the hitch pin 7 is released using a traction-operated unlocking device 47. The turnpins 10 in engagement with the bearing eyes 11 are prevented from sliding out horizontally by means of a safety device 13 described in more detail in connection with FIGS. 8 and 9.

FIGS. 8 and 9 show a bearing box 48 fixedly secured to the main girders 12. There is a pivoting securing hook 15 mounted in the bearing box 48 able to pivot about the hook pivot point 19 and which in the snapped-in condition fits onto the turnpin 10. A spring loaded toggle lever 14 which urges the securing hook 15 into the locked setting is pivot-mounted on a pin, and is able to come into engagement with the stop 17 (here in the form of an adjustable set screw) after moving through the dead-center position. The respectively desired setting of stop 17 is secured by means of a lock-nut 18. The pivot point 19 of the hook is in the same horizontal plane as the center 20 of the turnpin 10 so that no moment is produced acting on the securing hook 15. By means of an actuating lever 16 it is possible for the securing hook 15 to be disengaged and using a wire control 51 it may be caused to snap into engagement with a suitable part of the bus.

FIG. 10 serves to indicate how the passage at a rear end 23 of the vehicle may be opened or closed using a rear door 24. This is performed using a crank and linear guide system, the rear door 24 having its lower end guided along a circular guide path 27 using the crank 29 and a thrust rod 30. By means of pivoted rollers 32 mounted on the upper end of the rear door 24, which run in a guide rail 28 connecting with a straight guide part. The rear door, now restricted by a stop 33 is accomodated between the roof 25 of the vehicle and its ceiling 26 so that it is out of sight.

FIGS. 11 and 12 show the arrangement of the bellows 35, which is made up of bellows sections 40 and 41, between the traction vehicle 1 and the trailer 2 or between the trailer 2 and the trailer 3. A bellows frame 42 is mounted on the fifth wheel 8 of the towbars in a fixed but yet rotatable manner. The sections 40 and 41 of the bellows 35 are secured in a known manner to this bellows frame by means of wires 39. Similarly one section 41 is lashed to the front end of the trailer. There is a terminal frame 36 mounted on the rear end of the traction vehicle 1 or of the trailer 2 and it is connected with the rear end 23 by way of a toggle lever locking device 38 and a seal 37. The section 40 of the bellows 35 is secured in a conventional manner to the terminal frame 36 by means of wire 39.

FIG. 12 indicates that the bellows frame 42 is connected with rigid struts 44, which are secured to the terminal frame 36 for pivoting about the pivot point 43.

The connection of the control and supply lines between the traction vehicle 1 and the trailer 2 or between the trailer 2 and the trailer 3 is by way of quick-release couplings which are not shown in the figures.

What is claimed is:

1. An articulated omnibus comprising a plurality of articulated segments including a traction vehicle drivable on a roadway and at least one trailer connected to the traction vehicle for being towed thereby, means releasably interconnecting adjacent segments for relative articulated movement, said means comprising a towbar having one end rotatably connected to one of the interconnected articulated segments and a hitch pin at the other end of the towbar, the other of the segments including a hitch in which said hitch pin is supported for pivotal movement around a vertical axis and means supporting said towbar from said other segment for pivotal movement about a horizontal axis disposed between said hitch pin and the rotatable connection of the towbar to said one segment so that said adjacent segments are capable of relative pitching and rotatable movements, said other segment including a floor frame, said means which supports said towbar from said other segment comprising horizontal pins pivotally connecting said towbar to said floor frame.

2. An articulated omnibus as claimed in claim 1 comprising releasable security means for securing said horizontal pins in connected state between said towbar and said floor frame.

3. An articulated omnibus as claimed in claim 2 wherein said security means comprises security hooks engaged on said horizontal pins to prevent removal thereof and spring-loaded toggle lever means engaging said hooks to hold the same on the pins to prevent removal of the pins.

4. An articulated omnibus as claimed in claim 3 wherein said security means further comprises an actuator lever coupled to said toggle lever means to move the same and release the hooks on the pins, and stop means engaging the toggle lever means in a locked position on the hooks, said toggle lever means having a dead center position through which the toggle lever means moves when going between the locked position of the hooks on the pins and the released position of the hooks from the pins.

5. An articulated omnibus as claimed in claim 4 wherein said stop means includes a set screw and a lock nut.

6. An articulated omnibus as claimed in claim 3 comprising pins supporting said hooks for pivotable movement around an axis disposed in a plane containing said horizontal pins which pivotally connect the towbar to the floor frame.

7. An articulated omnibus as claimed in claim 6 wherein said other segment includes a guide ramp under said hitch slidably engageable by said tow bar.

8. An articulated omnibus as claimed in claim 7 comprising means engaging opposed facing ends of the articulated segments for opening and closing passage openings between said ends.

9. An articulated omnibus comprising a plurality of articulated segments including a traction vehicle drivable on a roadway and at least one trailer connected to the traction vehicle for being towed thereby, means releasably interconnecting adjacent segments for relative articulated movement, said means comprising a towbar having one end rotatably connected to one of the interconnected articulated segments and a hitch pin at the other end of the towbar, the other of the segments including a hitch in which said hitch pin is supported for pivotal movement around a vertical axis, means supporting said towbar from said other segment for pivotal movement about a horizontal axis disposed between said hitch pin and the rotatable connection of the towbar to said one segment so that said adjacent segments are capable of relative pitching and rotatable movements, wherein passages are defined between adjacent articulated segments, said omnibus further comprising bellows having opposite ends connected to said adjacent segments for closing said passages therebetween, a terminal frame detachably fixed to said towbar, one end of said bellows being connected to said frame, seal means on said other of the articulated segments, a toggle lever locking means on said other of the articulated segements for pressing said frame against said seal means, and means for lashing the other end of the bellows to said one articulated segment.

10. An articulated omnibus as claimed in claim 9 wherein said bellows is divided into two sections, and a bellows frame to which the two sections of the bellows are connected, said bellows frame being mounted on the towbar for rotation therewith around the rotatable connection of the towbar to said one articulated segment.

11. An articulated omnibus as claimed in claim 10 further comprising two struts connected to the terminal frame and having a point of intersection and pivot means joining said struts at said point of intersection to said bellows frame.

12. An articulated omnibus as claimed in claim 1 comprising supply and control lines with quick release connectors between the adjacent articulated segments.

13. An articulated omnibus comprising a plurality of articulated segments including a traction vehicle drivable on a roadway and at least one trailer connected to the traction vehicle for being towed thereby, means releasably interconnecting adjacent segments for relative articulated movement, said means comprising a towbar having one end rotatably connected to one of the interconnected articulated segments and a hitch pin at the other end of the towbar, the other of the segments including a hitch in which said hitch pin is supported for pivotal movement around a vertical axis, means suporting said towbar from said other segment for pivotal movement about a horizontal axis disposed between said hitch pin and the rotatable connection of the towbar to said one segment so that said adjacent segments are capable of relative pitching and rotatable movements, a hinged rear door on the rear end of at least said traction vehicle and means enabling said rear door to be moved between a vertical closed portion and an open position, said rear door in said position being accomodated in a space between a roof and a ceiling of said traction vehicle, said means enabling the rear door to be moved between the open and closed positions comprising a crank and linear guide system for the operation of the rear door, said rear door in the closed position being aligned with an outer contour of the rear end of the traction vehicle, said crank and linear guide system including a crank member and thrust rod connected to said traction vehicle and to said rear door to guide the movement of the rear door at its lower end along a circular path, a linear guide on the traction vehicle engaging the rear door at the upper end thereof to guide the rear door for movement between its open and closed positions, rollers pivotably connected at the upper end of the door and running in the linear guide, and stop means cooperating with said rollers to hold said door in a horizontal end position in the open position of the door.

14. An articulated omnibus comprising a plurality of articulated segments including a traction vehicle drivable on a roadway and at least one trailer connected to the traction vehicle for being towed thereby, means releasably interconnecting adjacent segments for relative articulated movement, said means comprising a towbar having one end rotatably connected to one of the interconnected articulated segments and a hitch pin at the other end of the towbar, the other of the segments including a hitch in which said hitch pin is supported for pivotal movement around a vertical axis, means supporting said towbar from said other segment for pivotal movement about a horizontal axis disposed between said hitch pin and the rotatable connection of the towbar to said one segment so that said adjacent segments are capable of relative pitching and rotatable movements and a rotatable connection means between said towbar and said one articulated segment providing the rotatable connection therebetween around a vertical axis, said rotatable connection means comprising a fifth wheel connecting said towbar and said one articulated segment.

* * * * *